(12) United States Patent
Thyagaturu et al.

(10) Patent No.: US 12,399,754 B2
(45) Date of Patent: Aug. 26, 2025

(54) TECHNOLOGIES TO OFFLOAD WORKLOAD EXECUTION

(71) Applicant: Intel Corporation, Santa Clara, CA (US)

(72) Inventors: Akhilesh S. Thyagaturu, Tempe, AZ (US); James Rowan, Irmo, SC (US); Shweta Mokashi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 756 days.

(21) Appl. No.: 17/468,067

(22) Filed: Sep. 7, 2021

(65) Prior Publication Data

US 2021/0406091 A1  Dec. 30, 2021

(51) Int. Cl.
*G06F 9/46* (2006.01)
*G06F 9/50* (2006.01)

(52) U.S. Cl.
CPC .......... *G06F 9/5088* (2013.01); *G06F 9/5016* (2013.01); *G06F 9/5044* (2013.01)

(58) Field of Classification Search
CPC ..... G06F 9/5088; G06F 9/5016; G06F 9/5044
See application file for complete search history.

(56) References Cited

U.S. PATENT DOCUMENTS

| 2014/0282584 | A1 |  | 9/2014 | Feind |
| 2017/0060607 | A1 |  | 3/2017 | Hollinger |
| 2018/0150298 | A1 | * | 5/2018 | Balle ................... G06F 11/3409 |
| 2019/0065281 | A1 |  | 2/2019 | Bernat et al. |
| 2019/0121671 | A1 |  | 4/2019 | Bernat |
| 2019/0227843 | A1 |  | 7/2019 | Custodio et al. |

OTHER PUBLICATIONS

European First Office Action, (EP Exam Report Article 94(3) EPC), for Patent Application No. 22189045.2, Mailed Feb. 21, 2024, 6 pages.
Extended European Search Report for Patent Application No. 22189045.2, Mailed Feb. 7, 2023, 12 pages.
Khor, Wan Yong, et al., "Evaluation of FPGA Based QSPI Flash Access Using Partial Reconfiguration", 2019 7th International Conference on Smart Computing and Communications (CSCC) Date of Conference Jun. 28-30, 2019, IEEE, 12 pages.

(Continued)

*Primary Examiner* — Gregory A Kessler
(74) *Attorney, Agent, or Firm* — Compass IP Law PC

(57) ABSTRACT

Examples described herein relate to an apparatus comprising: at least one processor and an accelerator pool comprising at least one fixed function hardware offload engine and at least one programmable hardware offload engine, wherein in connection with migration or instantiation of a service to execute on the at least one processor and unavailability of the at least one fixed function hardware offload engine to perform an operation for the service, configure at least one of the at least one programmable hardware offload engine to perform the operation for the service. In some examples, the operation comprises an operation performed by a fixed function hardware offload engine on a source platform from which the service was migrated.

20 Claims, 8 Drawing Sheets

(56) References Cited

OTHER PUBLICATIONS

Xia Tian, et al., "Ker-ONE: A new hypervisor managing FPGA reconfigurable accelerators", Journal of Systems Architecture, Elsevier BV, NL, vol. 98, May 13, 2019 (May 13, 2019), pp. 453-467, 15 pages.
Amd, "Vivado Design Suite User Guide: Partial Reconfiguration", https://www.xilinx.com/support/documentation/sw_manuals/xilinx2018_1/ug909-vivado-partial-reconfiguration.pdf, UG909, Version 2018.1, Apr. 27, 2018, 147 pages.
Baker-Harvey, Miche, "Google Compute Engine uses Live Migration technology to service infrastructure without application downtime", https://cloudplatform.googleblog.com/2015/03/Google-Compute-Engine-uses-Live-Migration-technology-to-service-infrastructure-without-application-downtime.html, Google Cloud Platform Blog, Mar. 3, 2015, 7 pages.
Fukui, Shota et al., "A Self-partial Reconfiguration Framework with Configuration Data Compression for Intel FPGAs", Conference on Complex, Intelligent, and Software Intensive Systems. Springer, Cham, 2019, 11 pages.
Gueron, Shay, "Intel® Advanced Encryption Standard (AES) New Instructions Set", https://www.intel.com/content/dam/doc/white-paper/advanced-encryption-standard-new-instructions-set-paper.pdf, Intel White Paper, Revision 3.0, May 2010, 81 pages.
Intel Programable Solutions, "Partial Reconfiguration", https://www.intel.com/content/www/us/en/programmable/products/design-software/fpga-design/quartus-prime/features/partial-reconfiguration.html, 2018, 4 pages.
Intel, "Intel® Quartus® Prime Pro Edition User Guide: Partial Reconfiguration", Aug. 2, 2021, 137 pages.
Khor, Wan Yong et al., "Evaluation of FPGA Based QSPI Flash Access Using Partial Reconfiguration", 2019 7th International Conference on Smart Computing & Communications (ICSCC). IEEE, 2019, 5 pages.
Kubernetes Blog, "Running MongoDB on Kubernetes with StatefulSets", https://kubernetes.io/blog/2017/01/running-mongodb-on-kubernetes-with-statefulsets/, Jan. 2017, 6 pages.
McFdden, Gordon, "NGINX* Transport Layer Security (TLS) and Payload Compression Accelerated with Intel® QuickAssist Technology", https://www.nginx.com/wp-content/uploads/2018/12/NGINX-Conf-2018-slides_McFadden-QuickAssist.pdf, Copyright © 2018, 18 pages.
Open Source, "What is OpenStack?" https://opensource.com/resources/what-is-openstack, Feb. 2014, 6 pages.
Pittman, Richard Neil, "Partial Reconfiguration: A Simple Tutorial", Microsoft Research Technical Report MSR-TR 2012-19, Feb. 2012, 69 pages.
Posey, Brien, "Definition VMware vSphere", https://www.techtarget.com/searchvmware/definition/VMware-vSphere, TechTarget, Last updated Nov. 2017, 5 pages.
Red Hat, "What is Kubernetes?", https://www.redhat.com/en/topics/containers/what-is-kubernetes, Published Mar. 27, 2020, 14 pages.
VMware, Product Datasheet, "VMware vCenter Server: Centrally Managed Virtual Infrastructure Delivered with Confidence", Copyright © 2015, 2 pages.
Wikichip, "Configurable Spatial Accelerator (CSA)", https://en.wikichip.org/wiki/intel/configurable_spatial_accelerator, Last Modified Oct. 2, 2018, 9 pages.

* cited by examiner

| | | Partial Reconfiguration (Persona) File A | Partial Reconfiguration (Persona) File B | |
|---|---|---|---|---|
| Platform ID (i) | Device ID 1 | o | | |
| | Device ID 2 | | o | |
| Platform ID (ii) | o | | | o |

FIG. 5

TECHNOLOGIES TO OFFLOAD WORKLOAD EXECUTION

BACKGROUND

Data center operators such as cloud service providers (CSPs) provide various accelerator technologies to accelerate workloads in computing environments, such as high-performance computing (HPC) and cloud computing environments. These accelerators can be configured to perform special purpose computations. An example accelerator technology is a field-programmable gate array (FPGA) that includes an array of logic gates that can be programmed to fulfill specific tasks. Another accelerator technology uses application specific integrated circuits (ASICS) to perform particular tasks.

Accelerating a software or service functions in specialized hardware accelerator that is not executed on a central processing unit (CPU) core can be performed by enumerating the hardware accelerator as an input/output (I/O) device by an operating system (OS), and offloading the functional task to the I/O device either directly using CPU instructions such as Intel® Architecture instructions MOVDIR and ENQCMD, or by use of a kernel module and driver application program interfaces (APIs) to interact with the hardware accelerator. In current deployments, hardware-acceleration is enabled in the form of either-or approach, whereby an application could use a hardware accelerator if it exists, and if the hardware accelerator does not exist, fallback to execution by CPU-executed software or deployment onto software emulated hardware by the OS.

In service offerings over cloud and edge infrastructures, a key-aspect of application deployments is the scaling and migration of services from one physical infrastructure to another. Hardware dependency for acceleration of services poses a challenge in terms of hardware-accelerator availability at the destination platform, such as when the service is transferred via a migration or re-instantiated (e.g., service scaling) at the destination platform. Application deployments can be restricted to the platforms that supports hardware accelerations. These limitations can impede migration of the service to platforms that do not include the hardware accelerator utilized by the service and associated performance guarantees from scale out. As a result, service performance could be compromised for CPU executions due to non-availability of hardware-accelerator on the platforms.

FIG. 1 depicts an example service migration scenario where the service applications, containers, and virtual machines (VMs) executed on a source platform 100 are migrated to a target platform 150 which does not support the hardware-acceleration of the kind which was supported at a source platform of the service applications, containers, and VMs. For example, in this example, source platform 100 offers fixed function accelerators of QuickAssist Technology (QAT) for encryption and authentication, Data Streaming Accelerator (DSA) for data copying, and Hardware Queue Manager (HQM) for workload management. In this example, a service utilizes QAT to perform operations at source platform 100. However, service is migrated to target platform 150 but target platform 150 does not include a QAT to perform encryption operations for the service and the encryption operations are performed by a processor (e.g., CPU), which can slow performance of the encryption operations and reduced availability of the CPU to perform other operations.

BRIEF DESCRIPTION OF THE DRAWINGS

FIG. 5 depicts an example database.

DETAILED DESCRIPTION

Figure 1:
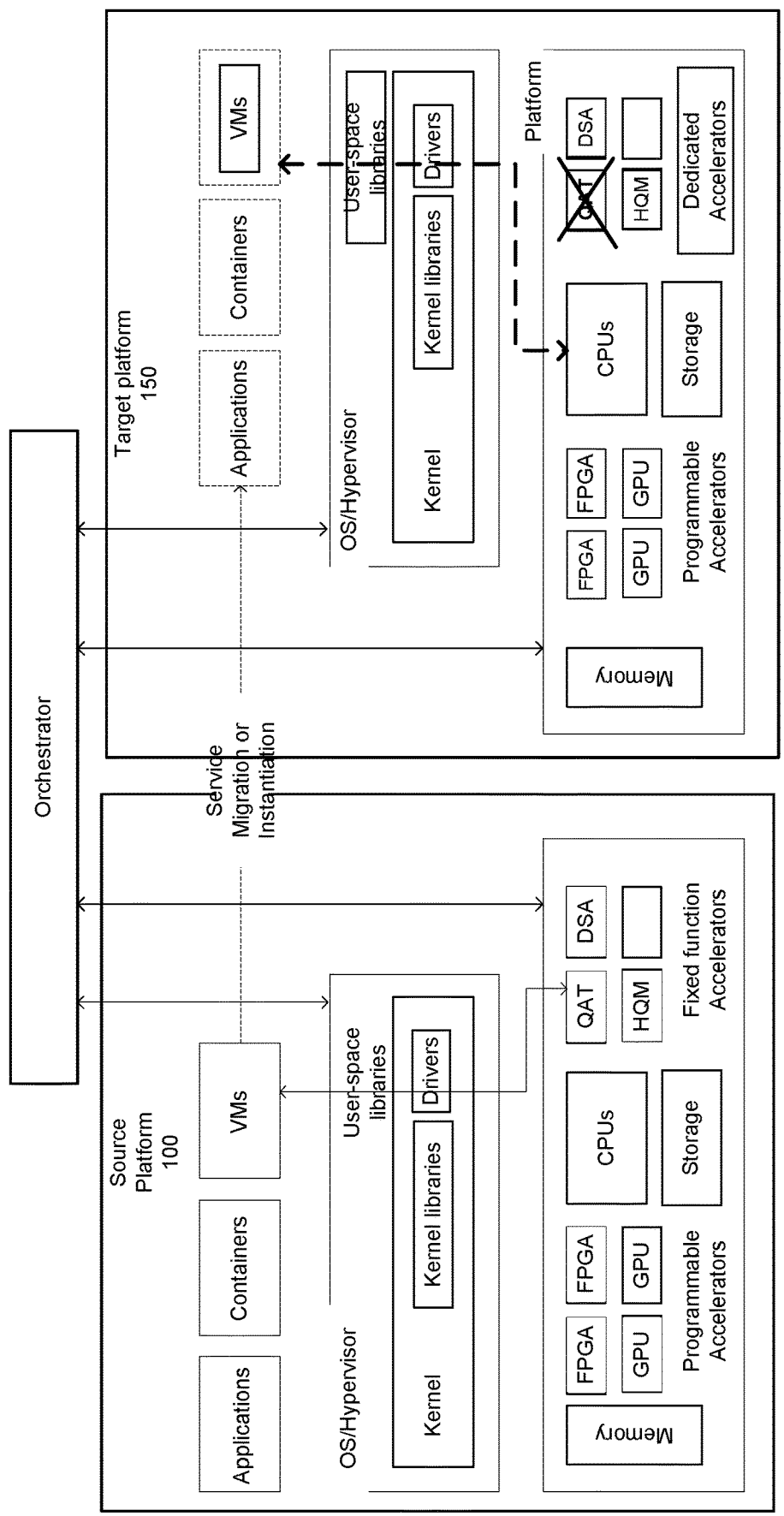
FIG. 1 depicts an example service migration scenario.

Cloud-native deployments are applied in datacenters and in edge infrastructures. Moreover, application dependency on hardware-accelerators is in cloud applications and also applied to client, and Internet-of-Things (IoT) infrastructures. Heterogeneous hardware-accelerators are available in such environments. Current and future cloud applications are implemented as microservices, where functional blocks of applications consist of multiple containers and VMs (represented as services) that are distributed across multiple platforms. To preserve the continuity of acceleration functions during service migration, some examples utilize programmable accelerator devices present in the target platform to perform operations of fixed function accelerator devices on a source platform. Various examples of service migration include Google VM migration, live migration, and others. The programmable accelerator devices can be reconfigured before the migration is performed or the migrated service is activated at the target platform, thereby preserving the acceleration continuity on the hardware even when the specific dedicated hardware accelerator does not exist at the target platform.

Some example platforms include one or more accelerator devices on a target platform implemented as field programmable gate arrays (FPGAs) which can be configured to perform a number of different operations. When there is no available fixed function hardware accelerator in the platform requested by booted or migrated services and applications, due to not being accessible or present or not having capacity to perform another operation, a programmable accelerator can be selected to perform operations of the fixed function hardware accelerator to attempt to avoid usage of a central processing unit (CPU) to perform the operations the fallback to offload of operations to a CPU software-only mode. Accordingly, a migrated application and service can maintain the service continuity during migration of services. During a migration process, hardware states of a formerly utilized fixed or programmable function accelerator can be transferred to the target programmable accelerators, and a driver for the of enabling reconfiguration of the programmable accelerator to perform operations of the fixed function accelerator. Configuration of the at least one of the FPGAs can take place using a binary executable stored in a library. An orchestrator or other management software or hardware can cause the at least one of the FPGAs to pre-load the binary prior to, during, or after completion of migration of the service. Availability of a programmable accelerator at a target platform can help to meet the service level agreement (SLA) of a workload.

In some examples, to configure an application to execute on a target platform, changes such as hardware accelerator specific libraries (e.g., static or dynamic), drivers, and hardware interactions such as initialization, application program interfaces (APIs) for job submission may need to occur. Some examples allow an application to be migrated or booted, without one or more of such changes, and utilize a hardware accelerator at a target platform. At the target platform, applications can interact with a hardware accelerator specific driver to submit a workload request to a programmable acceleration device.

Examples described herein can be used in connection with instantiation or booting an application, virtual machine, container, microservice, or other software and not merely migration of a virtual machine or container.

Figure 2:
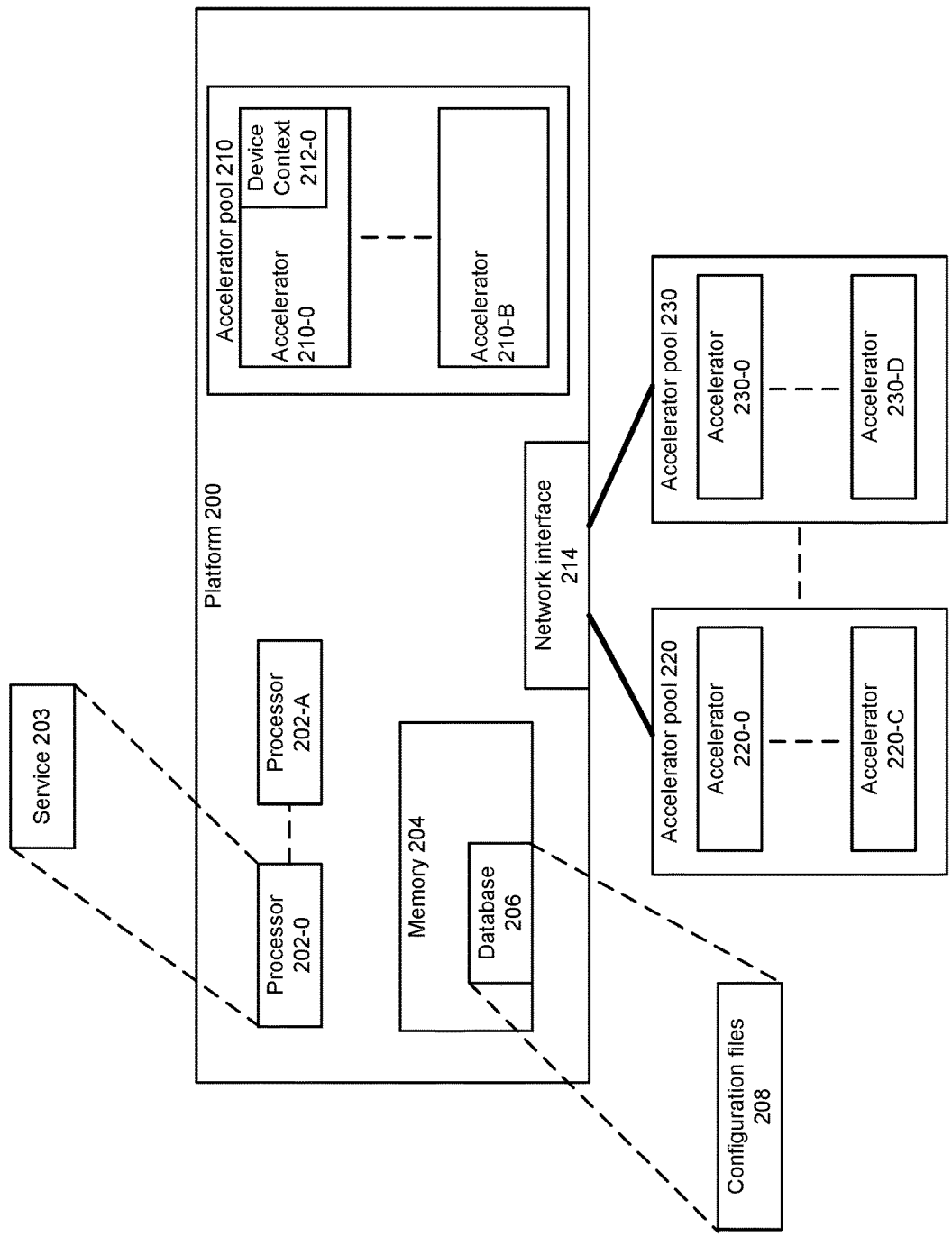
FIG. 2 depicts an example platform.

FIG. 2 depicts an example platform. Platform 200 can represent a configuration of a source platform or a target platform. A source platform can execute a service 203, which is migrated to a target platform. In some examples, platform 200 can represent a configuration of an infrastructure processing unit (IPU) or data processing unit (DPU). Although not depicted, device-to-device communications can utilize motherboard traces or other conductive signal transferring technologies as well as proprietary or standard protocols.

One or more of processors 202-0 to 202-A, where A is an integer that is 1 or more, can include an execution core or computational engine that is capable of executing instructions. A core can have access to its own cache and read only memory (ROM), or multiple cores can share a cache or ROM. Cores can be homogeneous and/or heterogeneous devices. Any type of inter-processor communication techniques can be used, such as but not limited to messaging, inter-processor interrupts (IPI), inter-processor communications, and so forth. Cores can be connected in any type of manner, such as but not limited to, bus, ring, or mesh. Cores may be coupled via an interconnect to a system agent (uncore). System agent can include a shared cache which may include any type of cache (e.g., level 1, level 2, or last level cache (LLC)). System agent can include or more of: a memory controller, a shared cache, a cache coherency manager, arithmetic logic units, floating point units, core or processor interconnects, or bus or link controllers. System agent or uncore can provide one or more of: direct memory access (DMA) engine connection, non-cached coherent master connection, data cache coherency between cores and arbitrates cache requests, or Advanced Microcontroller Bus Architecture (AMBA) capabilities. System agent or uncore can manage priorities and clock speeds for receive and transmit fabrics and memory controllers.

A core may support one or more instructions sets (e.g., the x86 instruction set (with some extensions that have been added with newer versions); the MIPS instruction set of MIPS Technologies of Sunnyvale, CA; the Advanced RISC Machines (ARM) instruction set (with optional additional extensions such as NEON) of ARM Holdings of Sunnyvale, CA), including the instruction(s) described herein. In addition or alternative to use of a CPU, an XPU or xPU could be used. An XPU can include one or more of: a graphics processing unit (GPU), general purpose GPU (GPGPU), field programmable gate arrays (FPGA), Accelerated Processing Unit (APU), accelerator or another processor.

In some examples, processor 202-0 can execute service 203. Service 203 can be implemented as an application, one or more microservices, an application within a virtual machine (VM), an application within a container, or other implementation. Although not depicted, various software (e.g., operating system (OS), driver, application program interfaces (APIs), and so forth) can be used to provide communication between service 203 and other devices. Multiple services can be executed on one or more of processors 202-0 to 202-A. Service 203 can request execution of an operation by one or more of accelerators 210-0 to 210-B, where B is an integer of 1 or more. Accelerators 210-0 to 210-B can include fixed and/or programmable devices including one or more of: graphics processing units (GPUs), FPGAs, Compute Spatial Arrays, and application specific integrated circuit (ASIC).

One or more of accelerators 210-0 to 210-B can be accessible to one or more of processors 202-0 to 202-A via a bus or other device interface technology such as device interfaces consistent with Peripheral Component Interconnect Express (PCIe), Compute Express Link (CXL). See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof. In some examples, one or more of accelerators 210-0 to 210-B can be part of an uncore or system agent.

For example, where an accelerator is an ASIC and is available to perform the operation, the ASIC accelerator can be chosen to perform the operation. Various examples of operations include but are not limited to: compression, hash/authentication capabilities, encryption, decryption, or other operations. In the event that the ASIC accelerator is not able to complete the operation in a timely manner, the operation can be migrated to be performed on another ASIC accelerator and/or an FPGA accelerator among accelerators 210-0 to 210-B. An order of selection of accelerator technology can be an available ASIC accelerator followed by an available FPGA accelerator, in some examples.

Memory 204 can store a database 206 of configuration files 208 or parameters for one or more of accelerators 210-0 to 210-B that specify operations to perform. For example, a configuration file 208 can configure a programmable accelerator to perform operations of an accelerator implemented using ASIC technology. Database 206 can store configurations for programmable accelerator devices among accelerators 210-0 to 210-B. A configuration file 208 can include an executable binary, kernel, or instructions that can cause partial configuration of a hardware offload device that causes the accelerator device to perform one or more operations. Partial reconfiguration of an accelerator device can reconfigure operation of the accelerator device but retain a device interface link (e.g., PCIe link) to the accelerator device and the accelerator device does not need to be power recycled to perform the reconfigured operation, although the accelerator device can be power cycled. In some examples, a subset or strict subset of database 206 can be stored in a remote memory or storage device and accessible to platform 200 through a network. Examples of partial reconfiguration are described, for example, in: Fukui et al., "A Self-partial Reconfiguration Framework with Configuration Data Compression for Intel FPGAs," Conference on Complex, Intelligent, and Software Intensive Systems, Springer, Cham, 2019 and Khor et al., "Evaluation of FPGA Based QSPI Flash Access Using Partial Reconfiguration," 2019 7th International Conference on Smart Computing and Communications (ICSCC), Institute of Electrical and Electronics Engineers (IEEE) 2019.

An orchestrator can create and populate database 206 with configuration files 208. In case of GPUs, a GPU-and-hardware accelerator specific binary configuration file 208 can be generated prior to deployment, and maintained in database 206, such that, when needed, the GPUs can be programmed to offer services of dedicated hardware-accelerators.

In some examples, multiple binaries of an application, virtual machine, container, microservice, or other software can be stored and the multiple binaries could be available to copy and execute on a particular hardware device selected to execute an operation, such as a programmable accelerator (e.g., FPGA), graphics processing unit (GPU), and/or central processing unit (CPU).

In some examples, as described herein, in connection with migration of service 203 to another platform (e.g., target platform), a device context 212-0 of an accelerator 210-0 that executes an operation for service 203 can be copied to the target platform and configure a state of an accelerator device to match that of an accelerator device used by service 203 prior to migration of service 203.

The accelerator device(s) on the target platform can be configured to perform operations of the accelerator device(s) on the source platform using configuration files accessible at the target platform such as from memory 204 or through another memory device. Note that if multiple accelerators are performing operations offloaded by service 203, the multiple device contexts for the multiple accelerators can be copied to the target platform and configure one or more accelerator devices to be used by service 203 after migration of service 203. Note that the accelerator 210-0 on a source platform can be a fixed or programmable accelerator and the accelerator to be used by service 203 after migration of service 203 can be a fixed or programmable accelerator.

In some examples, multiple tiers of accelerator platforms can be available (e.g., accelerator pools 220 and 230). In some examples, accelerator pool 210 is a different tier (e.g., higher or lower) than that of accelerator pool 220 or 230. In some examples, accelerator pool 220 can include accelerator devices 220-0 to 220-C that perform operations faster than those of accelerator devices 230-0 to 230-D associated with accelerator pool 230. Accelerator devices 220-0 to 220-C and 230-0 to 230-D can be implemented as a fixed or programmable accelerator device. The accelerator pools 220 and 230 can be accessible through a network or via device interface in some examples. An accelerator pool can be selected based on a tier or priority of a service or the tier or priority of an operation offloaded from the service so that a faster performing accelerator pool is selected for higher tier or higher priority service or offloaded operation than that of a lower tier or lower priority service or offloaded operation.

Various examples partially configure one or more accelerator devices on a target platform to be used by service 203. An orchestrator can determine when to migrate service 203 and to what target platform among multiple available target platforms in a server or data center or multiple data centers. Conditions for migrating service 203 can include one or more of: power loss or failure at a source platform, determination that a source platform is not able to perform service 203 within applicable service level agreement (SLA) parameters and another platform (e.g., target platform) can perform service 203 in accordance with applicable SLA parameters. In some examples, an IPU or DPU can select a target platform and accelerators for use at the target platform.

Network interface device 214 can be used to migrate service 203, copy a configuration file 208 to another platform, copy device context 212-0 to another platform or device, and copy other information. Network interface device 214 can be implemented as one or more of: a network interface controller (NIC), SmartNIC, router, switch, forwarding element, infrastructure processing unit (IPU), or data processing unit (DPU).

Figure 3:
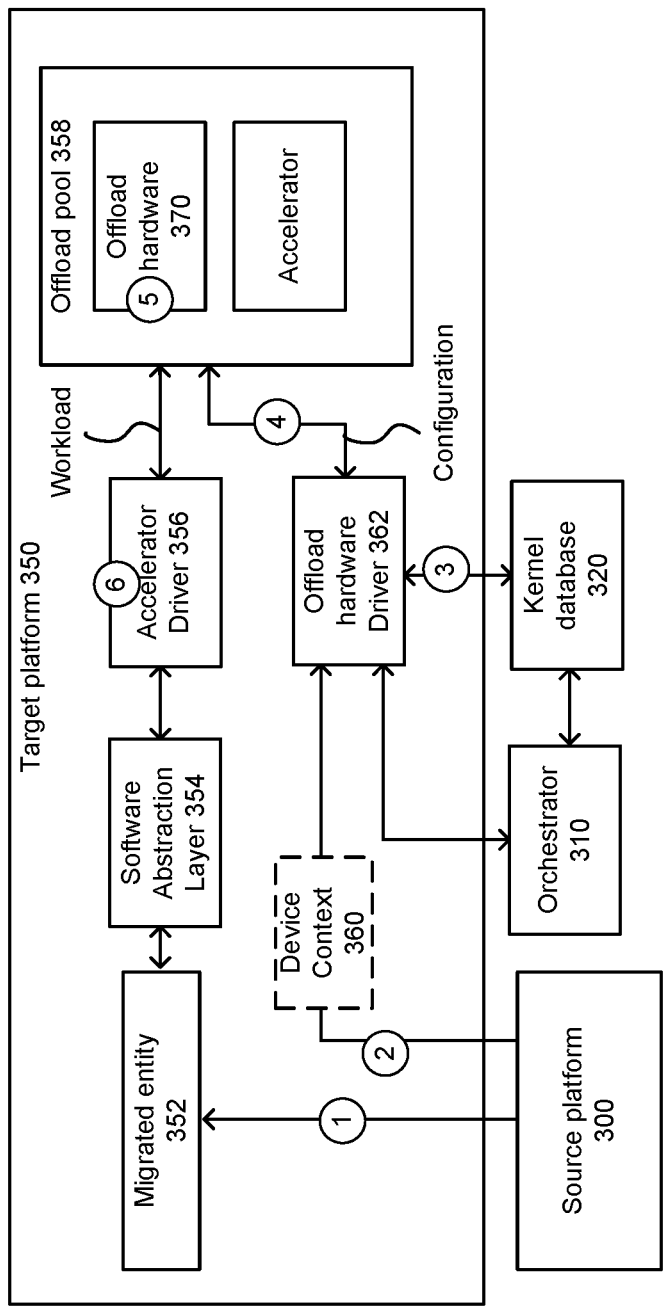
FIG. 3 depicts an example sequence for accelerator configuration.

An example operation of the system of FIG. 2 can be as described with respect to FIG. 3 in which the system of FIG. 2 is a target platform. Offload pool 358 of target platform 350 can include one or more configurable offload hardware devices, including offload hardware 370, and one or more accelerator devices. At (1), at or before initiating migration of the migrated entity 352 from source platform 300 to target platform 350, orchestrator 310 can determine that a fixed function hardware accelerator that performs operations on source platform 300 for migrated entity 352 is not available on target platform 350 and request reconfiguration of offload hardware 370 to provide functions or operations to be requested by migrated entity 352. Offload hardware 370 can be a programmable and reconfigurable accelerator device. Note that migrated entity 352 need not have been executed previously on source platform 300 but can be instantiated for execution first on target platform 350.

At (2), as part of migration of migrated entity 352, source platform 350 can provide device context 360 to target platform 350, so that continuity of the workload from migrated entity 352 can be maintained. For example, device context can include workload queue, queue size, application specific settings for the accelerator, etc. At (3), database 320 can provide the offload hardware with a configuration file, such as a partial reconfiguration binary.

Orchestrator 310 can utilize management tools such as vSphere, vCenter, OpenStack and Kubernetes to configure target platform 350 to configure a configurable offload hardware 370 to perform particular operations. For instance, hardware capabilities of devices in offload pool 358 can be exposed to orchestrator 310 through hardware capability sharing framework. Target platform 350 and its OS can permit management of one or more accelerators in offload pool 358 by orchestrator 310 to allow at least partial reconfiguration. Orchestrator 310 can also cause database 320 to insert or remove configuration files and cause copying of configuration files from database 320 to target platform 350. A framework can be provided to enable acceleration function upgrades, secure data and reconfiguration binary file management, and hardware resource tracking of platforms for load balancing of workloads which can be used for enforcing the overall quality of service.

At (4) and (5), offload hardware driver 362 can configure or enable/disable offload hardware 370. For instance, while applying the device context, management transactions can occur between offload hardware 370 and offload hardware driver 362. At (6), migrated entity 352 can issue a request to offload an operation to offload hardware 370. The software abstraction layer can provide an application program interface (API) for migrated entity 352 to interact with accelerator driver 356 and the offload hardware 370. Accelerator driver 356 can provide job submissions from migrated entity 352 to offload hardware 370 or, if available, a fixed function accelerator device in offload pool 358 to perform the job.

Figure 4:
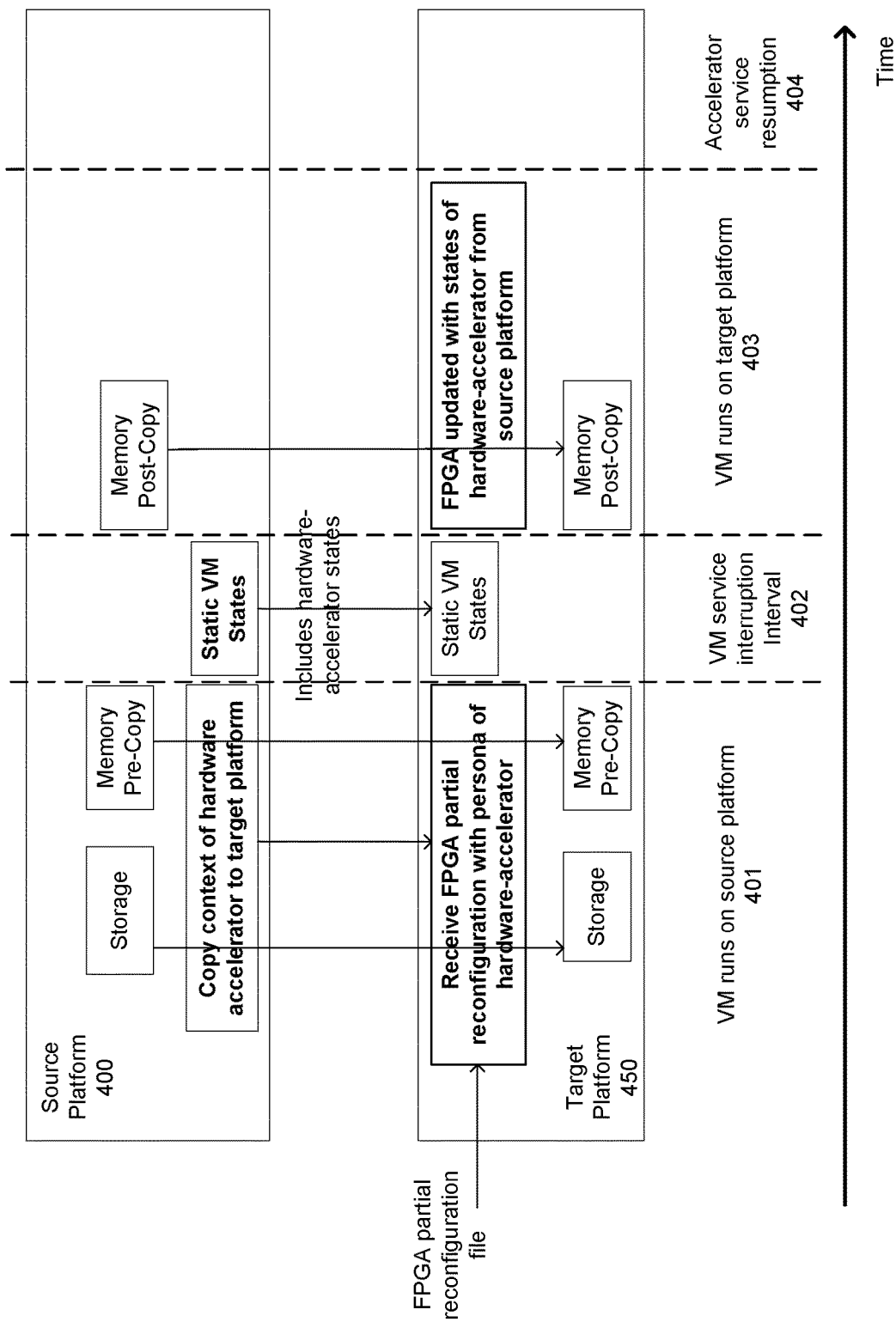
FIG. 4 depicts an example sequence for accelerator configuration.

FIG. 4 depicts an example configuration of a hardware offload device in connection with migration of a VM. Although the example is shown for a VM, the example can apply to migration of a container, service, microservice, processor, or other software from execution on source platform 400 to execute on target platform 450. In some examples, during 401, while the VM executes on source platform 400, context of the hardware accelerator utilized by the VM can be copied to target platform 450 and the configuration file to configure a programmable accelerator can be copied to target platform 450. In some examples, during 402, execution of the VM at source platform 400 is interrupted and during interruption of the execution of the VM, VM states and hardware accelerator states of the hardware accelerator used by the VM on source platform 400 can be copied to target platform 450. In some examples, during 403, the VM can execute on target platform 450. While or before the VM executes on target platform 450, the programmable accelerator can be updated with states of the hardware accelerator used by the VM on source platform 400. Hardware states can include an identifier value associated with a hardware accelerator that is used to associate requests and responses with the hardware accelerator. Hardware states can include hardware accelerator states during execution of a workload, such as states of state machines, loop logic states, register values, function return pointers, and so forth. In some examples, during 404, the VM can offload operations to the programmable accelerator. Network interface devices can be used in the migration and context copy from the source platform to the destination platform.

The configuration can be used with migration of a process from a source to destination platform with FPGA reconfiguration, where the storage memory components are pre-copied before VM states are saved, moved, and restored at the destination platform. The FPGA reconfiguration of hardware-accelerator can be split between service interruption phase (e.g., VM pause) of live migration where FPGA configuration is applied before the static VM states are transferred to target platform. Device context can be transferred from source to designation VM.

FIG. 5 depicts an example of configuration file database. The reconfiguration binary files (e.g., personas) can be associated with particular platform identifiers and devices within a platform. Files can be retrieved and forwarded to a target platform for device reconfiguration. The database can be created prior to deployment of a service and the configuration file (persona file) can be created specifically for an individual FPGA-based hardware accelerator device. The reconfiguration of hardware accelerator devices can be independent of application development. That is, in some examples, applications need not be adapted (e.g., software modifications) for use of an FPGA or dedicated hardware-accelerator.

Figure 6:
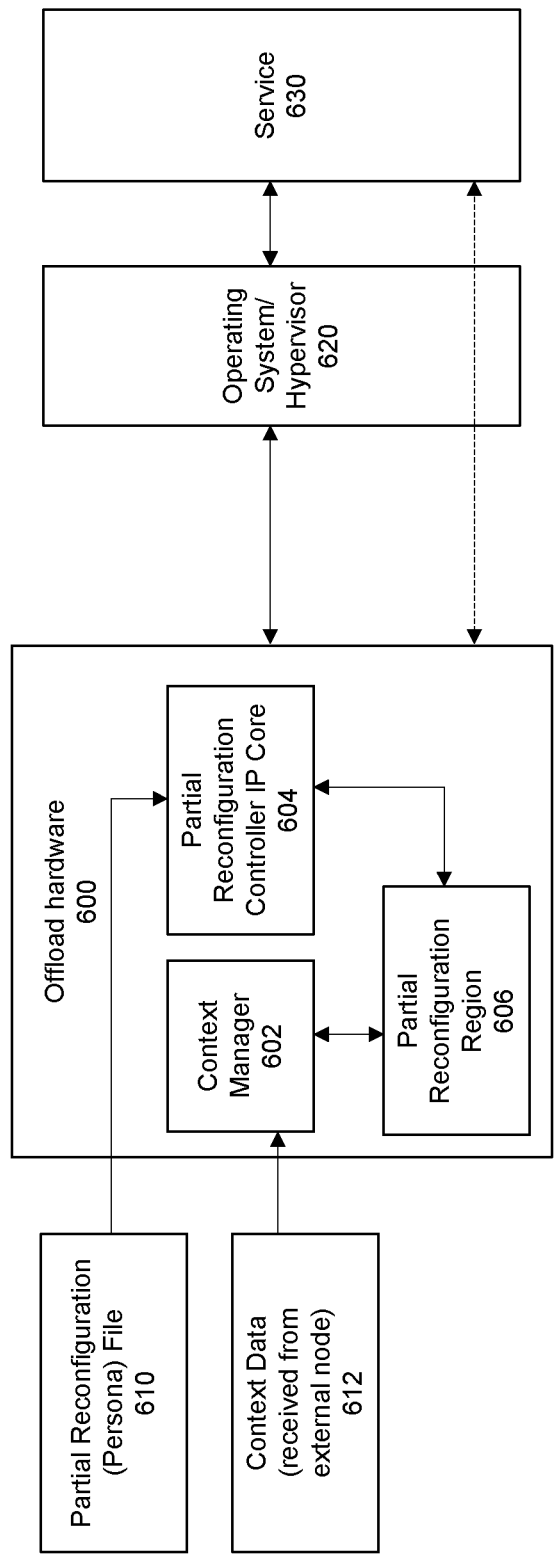
FIG. 6 depicts an example system.

FIG. 6 depicts an example of use of offload hardware by a service. In this example, service 630 can be instantiated or migrated to a target platform. The target platform can include offload hardware 600 that is configured to perform operations of a fixed function accelerator. In some examples, OS or hypervisor 620 can provide a software interface between service 630 and offload hardware 600. In some examples, service 630 includes instructions to request use of the fixed function accelerator and some examples of OS or hypervisor 620 provide offload hardware 600 as a substitute for a fixed function accelerator. Partial reconfiguration region 606 can include partial reconfiguration file 610 from a database that is stored on the target platform or accessible through a network. For example, an IP core 604 of offload hardware 600 can be partially reconfigured as described herein to perform one or more operations of the fixed function accelerator. Context manager 602 can receive context data 612 of an accelerator (either fixed function or programmable) that service 630 utilized when executing on a prior platform.

Figure 7:
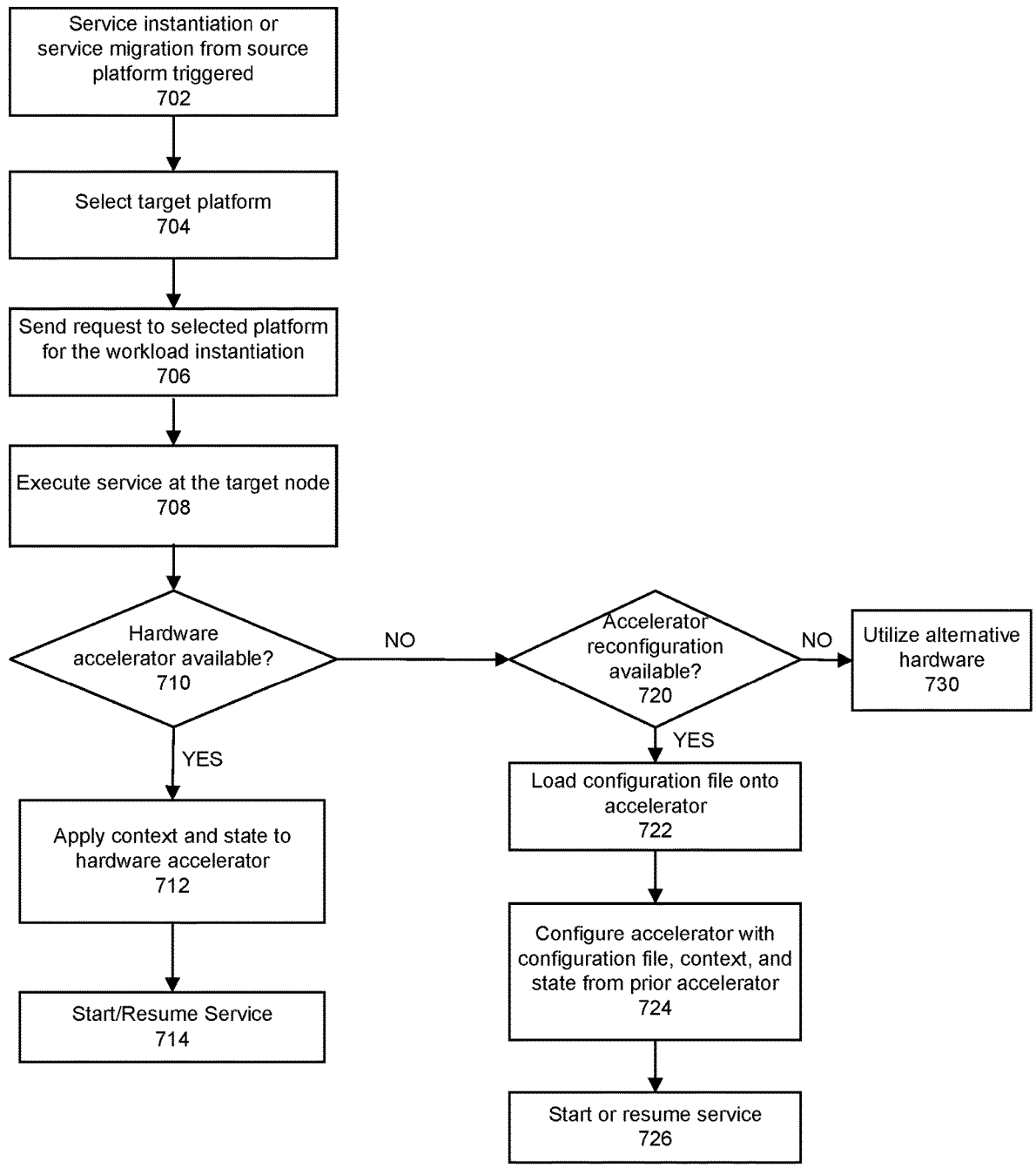
FIG. 7 depicts an example process.

FIG. 7 depicts an example process where the platform is selected for migration where services can utilize other forms of acceleration such as FPGAs as an alternative to dedicated hardware-accelerator. An FPGA can be reconfigured to expose as platform property in the form of a new device function, which can be utilized by VMs, containers, applications, and OS.

At 702, a service instantiation (e.g., VM boot or application execution) or service migration from a source platform to a target platform can be triggered. A service migration can be triggered based on conditions such as one or more of: power loss at a source platform, determination that source platform is not able to perform the service within appliable service level agreement (SLA) parameters and a target platform can perform the service in accordance with applicable SLA parameters, or other triggers.

At 704, the target platform can be selected based on one or more of: network conditions (e.g., available bandwidth between the source and target nodes), geographic proximity to the source platform, availability of computing resources on the target node, available processor or accelerator resources, and workload requirements of the service. In some examples, an orchestrator can initiate instantiation or migration of a service. In some examples, an IPU, DPU, or source platform can initiate instantiation or migration of a service. At 706, a request can be sent to the selected target platform to execute the service. The request can be sent via a network to the target platform.

At 708, the service can be instantiated or migrated to the target platform. For example, for a service instantiation, a VM image can be applied at the target platform and executed by a processor. For example, for migration of the service from the source platform to the target platform, hardware accelerator contexts and states utilized by the service can be copied from the source platform to the target platform.

At 710, a determination can be made if a hardware accelerator utilized by the service at the source platform is also available at the target platform. For example, the determination if a hardware accelerator utilized by the service at the source platform is also available at the target platform can be made based on a processor executing the service at the target node determining an operation is to be offloaded to an accelerator device. If a hardware accelerator that performs operations utilized by the service at the source platform is also available at the target platform, the process can continue to 712. For example, the hardware accelerator can be a fixed function accelerator device such as an ASIC. If a hardware accelerator that performs operations utilized by the service at the source platform is not also available at the target platform, the process can continue to 720.

At 712, an available hardware accelerator can be configured with context and state of the hardware accelerator used by the service at the source node. At 714, the service can be started or resume operation after migration.

At 720, based on a hardware accelerator that performs operations utilized by the service at the source platform not also being available at the target platform, a determination can be made if a configurable accelerator is available at the target platform. For example, if an FPGA or other configurable accelerator is available for use by the instantiated or migrated service, the process can continue to 722. For example, if an FPGA or other configurable accelerator is not available for use by the instantiated or migrated service, the process can continue to 730.

At 722, a configuration file can be loaded onto the configurable accelerator. For example, the configurable accelerator can be configured using a configuration file from a database. At 724, the configurable accelerator can be partially configured to perform operations of a hardware accelerator device used by the service at the source platform. For example, the hardware accelerator device used by the service at the source platform can be a fixed function accelerator in some examples. At 724, the configurable accelerator can be configured with state and context from the hardware accelerator device used by the service at the source platform. At 726, the service can be started or resume operation after migration.

At 730, based on the configurable accelerator not being available for use by the instantiated or migrated service, a processor or graphics processing unit (GPU) can be used to perform an offloaded operation from the service.

Some embodiments can be used in connection with instantiation or migration of NGNIX applications. NGNIX is a load balancer application that is deployed in the servers with cloud-native principles. NGINX uses cryptography hardware acceleration for accelerating Public Key Encryption (PKE) functions and Rivest-Shamir-Adleman (RSA) asymmetric key exchange process with external client nodes. NGNIX uses OpenSSL to offload the RSA onto a cryptography hardware accelerator. If NGNIX were to use the hardware accelerated services, the NGNIX service is instantiated on hardware-accelerator enabled platforms, along with software libraries which supports hardware acceleration. Where cryptography hardware acceleration does not exist on a target platform either during the initial instantiation of service or during a migration of service, then execution could fallback to CPU-executed software mode. The orchestrator or entity that dictates instantiation or migration of services may also choose to decline the service instantiation or migration request if the target node platforms does not support hardware-accelerator. If a dedicated hardware accelerator is not available in the target platform, the orchestrator can select a target platform with a configurable accelerator device and configure the configurable accelerator device as described herein. An orchestrator could check for CPU specific acceleration such as Instruction Set (IS) optimizations (e.g., AESNI), and if not available, fallback to a CPU-executed software for operation offload.

Figure 8:
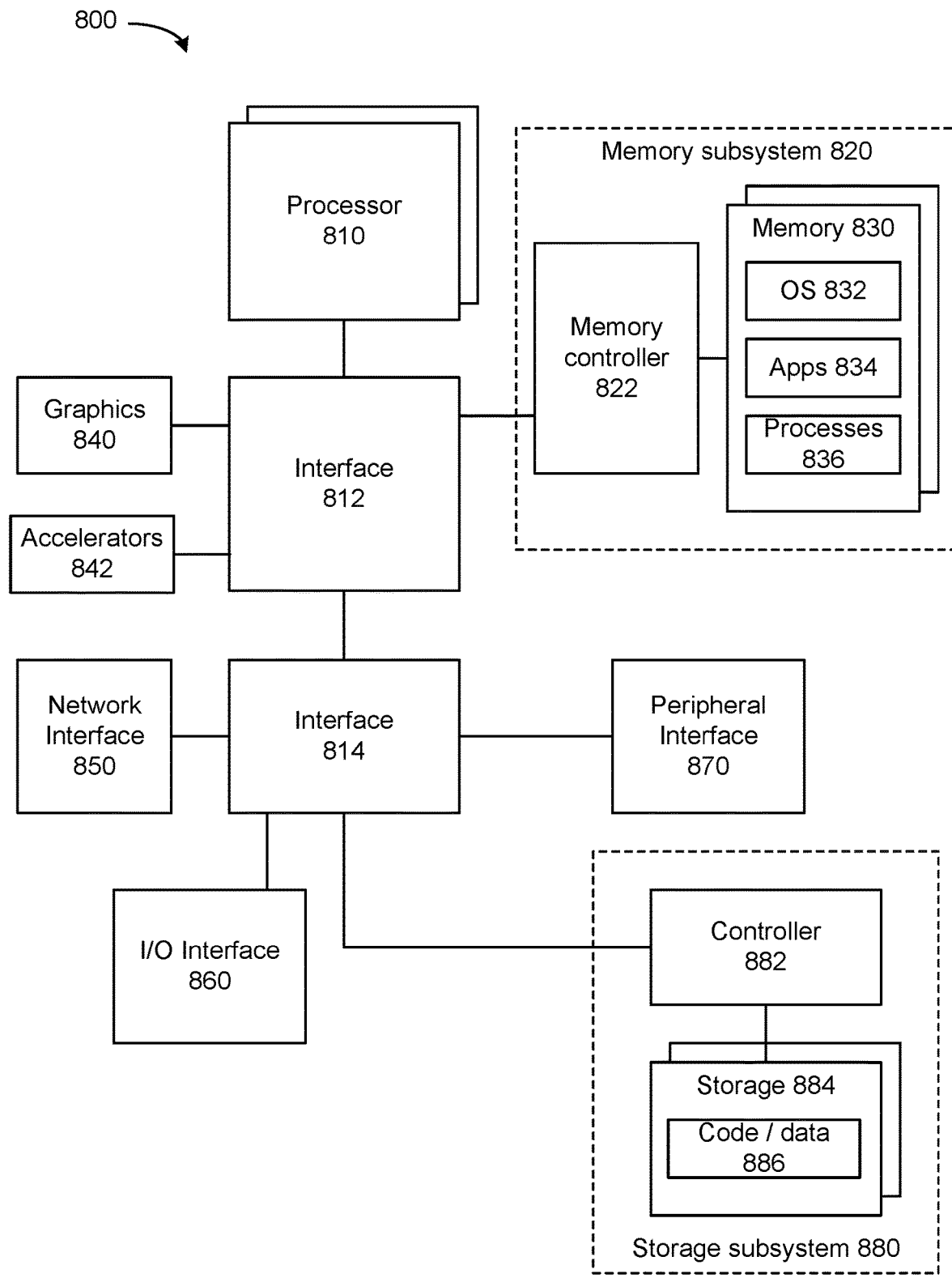
FIG. 8 depicts a system.

FIG. 8 depicts an example computing system. Components of system 800 (e.g., processor 810, accelerator 842, network interface 850, and so forth) to select a device to perform an offloaded workload and, if requested, configure a configurable accelerator to perform offload operations, as described herein. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others. In some examples, a driver can advertise capability of one or more accelerator devices to perform particular offload operations, even if one or more accelerator devices are configurable accelerator devices some examples. Other examples of driver operation include providing workloads to an accelerator device and configuring an accelerator device with settings.

While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include stand-alone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. Dynamic volatile memory uses refreshing the data stored in the device to maintain state. One example of dynamic volatile memory incudes DRAM (Dynamic Random Access Memory), or some variant such as Synchronous DRAM (SDRAM). An example of a volatile memory include a cache. A memory subsystem as described herein may be compatible with a number of memory technologies, such as DDR3 (Double Data Rate version 3, original release by JEDEC (Joint Electronic Device Engineering Council) on Jun. 16, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of one or more of the above, or other memory.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: at least one processor and an accelerator pool comprising at least one fixed function hardware offload engine and at least one programmable hardware offload engine, wherein in connection with instantiation of a service to execute on the at least one processor and unavailability of the at least one fixed function hardware offload engine to perform an operation for the service, configure at least one of the at least one programmable hardware offload engine to perform the operation for the service.

Example 2 includes one or more examples, wherein the operation comprises an operation performed by a fixed function hardware offload engine on a source platform from which the service was migrated.

Example 3 includes one or more examples, wherein the at least one of the at least one programmable hardware offload engine to perform the operation for the service is configured with an execution context of a device that performed the operation for the service at a source platform from which the service was migrated.

Example 4 includes one or more examples, wherein the execution context comprises one or more of: a queue size of at least one fixed function hardware offload engine at the source platform from which the service was migrated and application specific settings of at least one fixed function hardware offload engine at the source platform.

Example 5 includes one or more examples, wherein the at least one of the at least one programmable hardware offload engine to perform the operation for the service is configured using a configuration file by partial reconfiguration to maintain connectivity via a device interface with at least one other device.

Example 6 includes one or more examples, wherein the at least one programmable hardware offload engine comprises one or more: graphics processing units (GPUs), field programmable gate arrays (FPGAs), or Compute Spatial Arrays.

Example 7 includes one or more examples, and includes a data processing unit (DPU) that comprises circuitry to select an accelerator to perform one or more operations offloaded by the service.

Example 8 includes one or more examples, wherein the server comprises the at least one processor and the accelerator pool and the server comprises a network interface device to receive instructions to execute the service at the server.

Example 9 includes one or more examples, and includes a datacenter, wherein the datacenter is to provide for migration of the service from a source platform to a target platform with availability of a hardware offload engine.

Example 10 includes one or more examples, and includes a computer-readable medium comprising instructions stored thereon, that if executed by one or more processors, cause the one or more processors to: execute at least one driver to: select a configurable accelerator device at a target platform to execute at least one operation for a service, cause copying of accelerator device context to the selected configurable accelerator device at the target platform, and cause configuration of the selected configurable accelerator device at the target platform using a configuration file.

Example 11 includes one or more examples, wherein the at least one operation comprises at least one operation performed by a fixed function hardware offload engine on a source platform from which the service was migrated.

Example 12 includes one or more examples, wherein the accelerator device context comprises one or more of: a queue size of an accelerator device at a source platform from which the service was migrated and application specific settings of the accelerator device at the source platform from which the service was migrated.

Example 13 includes one or more examples, wherein the configuration of the selected configurable accelerator device at the target platform using a configuration file uses partial reconfiguration to maintain connectivity via a device interface with at least one other device.

Example 14 includes one or more examples, wherein the selected configurable accelerator device at the target platform comprises one or more: graphics processing units (GPUs), field programmable gate arrays (FPGAs), or Compute Spatial Arrays.

Example 15 includes one or more examples, and includes a method comprising: selecting a target platform on which to execute a service in connection with migration or instantiation of the service and based on availability of a configurable accelerator but no fixed function accelerator to perform a particular offload operation at the target platform, causing configuration of the configurable accelerator to perform the particular offload operation.

Example 16 includes one or more examples, and includes causing execution of an instance of the service at the selected target platform.

Example 17 includes one or more examples, wherein in connection with migration or instantiation of the service, the particular offload operation comprises an operation performed by a fixed function hardware offload engine on a source platform from which the service was migrated.

Example 18 includes one or more examples, wherein causing configuration of the configurable accelerator to perform the particular offload operation comprises causing configuration of the configurable accelerator with one or more of: a queue size of an accelerator device at a source platform from which the service was migrated and application specific settings of the accelerator device at the source platform from which the service was migrated.

Example 19 includes one or more examples, wherein causing configuration of the configurable accelerator to perform the particular offload operation comprises configuring the configurable accelerator device at the target platform using a configuration file and by partial reconfiguration to maintain connectivity via a device interface with at least one other device.

Example 20 includes one or more examples, wherein the configurable accelerator comprises one or more: graphics processing units (GPUs), field programmable gate arrays (FPGAs), or Compute Spatial Arrays.

What is claimed is:

1. An apparatus comprising:
at least one processor and
an accelerator pool comprising at least one fixed function hardware offload engine and at least one programmable hardware offload engine, wherein in connection with instantiation of a service, migrated from execution of another processor and/or executed on the another processor, to execute on the at least one processor:
select from among the at least one fixed function hardware offload engine, the at least one programmable hardware offload engine, and the at least one processor to perform an operation for the service by:
based on availability of the fixed function hardware offload engine to perform the operation, utilize the fixed function hardware offload engine to perform the operation for the service;
based on unavailability of the at least one fixed function hardware offload engine to perform the operation for the service and availability of the at least one programmable hardware offload engine to perform the operation for the service, configure the at least one of the at least one programmable hardware offload engine to perform the operation for the service; and
based on unavailability of the at least one programmable hardware offload engine to perform the operation for the service and availability of the at least one processor to perform the operation for the service, configure the at least one processor to perform the operation for the service.

2. The apparatus of claim 1, wherein the operation comprises an operation performed by a fixed function hardware offload engine on a source platform from which the service was migrated.

3. The apparatus of claim 1, wherein the at least one programmable hardware offload engine to perform the operation for the service is configured with an execution context of a device that performed the operation for the service at a source platform from which the service was migrated.

4. The apparatus of claim 3, wherein the execution context comprises: a queue size of at least one fixed function hardware offload engine at the source platform from which the service was migrated and application specific settings of the at least one fixed function hardware offload engine at the source platform.

5. The apparatus of claim 1, wherein the at least one programmable hardware offload engine to perform the operation for the service is configured using a configuration file by partial reconfiguration to maintain connectivity via a device interface with at least one other device.

6. The apparatus of claim 1, wherein the at least one programmable hardware offload engine comprises one or more: graphics processing units (GPUs), field programmable gate arrays (FPGAs), or Compute Spatial Arrays.

7. The apparatus of claim 1, comprising a data processing unit (DPU) that comprises circuitry to select from among the at least one fixed function hardware offload engine, the at least one programmable hardware offload engine, and the at least one processor to perform to perform the operation for the service.

8. The apparatus of claim 1, comprising a server, wherein the server comprises the at least one processor and the accelerator pool and the server comprises a network interface device to receive instructions to execute the service at the server.

9. The apparatus of claim 1, comprising a datacenter, wherein the datacenter comprises a processor to cause migration of the service from a source platform to a target platform that comprises the at least one processor and the accelerator pool.

10. At least one non-transitory computer-readable medium comprising instructions stored thereon, that if executed by one or more processors, cause the one or more processors to:
execute at least one driver to:
select from among a fixed function offload engine, a configurable accelerator device, or a processor at a target platform to execute at least one operation for a service, wherein the service was migrated from execution by another processor and/or executed on the another processor, and wherein the select from among the fixed function offload engine, the configurable accelerator device, or the processor is to prioritize selection of the configurable accelerator device over the processor to perform the at least one operation for the service, based on selection of the selected configurable accelerator device to perform the at least one operation for the service: cause copying of accelerator device context to the selected configurable accelerator device at the target platform and cause configuration of the selected configurable accelerator device at the target platform using a configuration file.

11. The computer-readable medium of claim 10, wherein the at least one operation comprises at least one operation performed by a fixed function hardware offload engine on a source platform from which the service was migrated.

12. The computer-readable medium of claim 10, wherein the accelerator device context comprises one or more of: a queue size of an accelerator device at a source platform from which the service was migrated and application specific settings of the accelerator device at the source platform from which the service was migrated.

13. The computer-readable medium of claim 10, wherein the configuration of the selected configurable accelerator device at the target platform using a configuration file uses partial reconfiguration to maintain connectivity via a device interface with at least one other device.

14. The computer-readable medium of claim 10, wherein the selected configurable accelerator device at the target platform comprises one or more: graphics processing units (GPUs), field programmable gate arrays (FPGAs), or Compute Spatial Arrays.

15. A method comprising:
selecting a target platform on which to execute a service in connection with migration or instantiation of the service and at the selected target platform:
based on availability of a fixed function accelerator to perform a particular offload operation, causing configuration of the fixed function accelerator to perform the particular offload operation and based on availability of a configurable accelerator but no fixed function accelerator to perform a particular offload operation, causing configuration of the configurable accelerator to perform the particular offload operation.

16. The method of claim 15, comprising:
causing execution of an instance of the service at the selected target platform.

17. The method of claim 15, wherein in connection with migration or instantiation of the service, the particular offload operation comprises an operation performed by a fixed function hardware offload engine on a source platform from which the service was migrated.

18. The method of claim 15, wherein causing configuration of the configurable accelerator to perform the particular offload operation comprises causing configuration of the configurable accelerator with one or more of: a queue size of an accelerator device at a source platform from which the service was migrated and application specific settings of the accelerator device at the source platform from which the service was migrated.

19. The method of claim 15, wherein causing configuration of the configurable accelerator to perform the particular offload operation comprises configuring the configurable accelerator at the target platform using a configuration file and by partial reconfiguration to maintain connectivity via a device interface with at least one other device.

20. The method of claim 15, wherein the configurable accelerator comprises one or more: graphics processing units (GPUs), field programmable gate arrays (FPGAs), or Compute Spatial Arrays.

* * * * *